United States Patent [19]

Melino

[11] Patent Number: 5,165,074
[45] Date of Patent: Nov. 17, 1992

[54] MEANS AND METHOD FOR CONTROLLING RASTER OUTPUT SCANNER INTENSITY

[75] Inventor: Robert H. Melino, Webster, N.Y.

[73] Assignee: Xerox Corporation, Stamford, Conn.

[21] Appl. No.: 569,681

[22] Filed: Aug. 20, 1990

[51] Int. Cl.⁵ .............................................. H04N 1/04
[52] U.S. Cl. .................................... 358/481; 358/406; 358/475
[58] Field of Search ............... 358/296, 300, 481, 406, 358/475; 355/69

[56] References Cited

U.S. PATENT DOCUMENTS

| | | | |
|---|---|---|---|
| 3,489,849 | 1/1970 | Hedger | 358/406 |
| 4,400,740 | 8/1983 | Traino et al. | 358/293 |
| 4,716,470 | 12/1987 | Levine | 358/481 |
| 4,727,382 | 2/1988 | Negishi et al. | 346/108 |
| 4,751,377 | 6/1988 | Ishizaka et al. | 358/406 |
| 4,958,221 | 9/1990 | Tsuboi et al. | 358/406 |

Primary Examiner—Stephen Brinich
Assistant Examiner—Thomas L. Stoll

[57] ABSTRACT

Output copy quality in a ROS electrophotographic printer is maintained by a method and apparatus designed to selectively vary the beam intensity level of a laser beam scan in response to changed conditions within the scanning or xerographic output subsystems. A test pattern video data input is periodically applied to a laser creating an exposure of the test pattern at the photoreceptor. The resulting print has a plurality of horizontal bands with each band associated with a specific beam intensity correction signal. The test pattern band which appears to provide optimum density is identified. The corresponding digital beam intensity correction signal in the ESS memory is enabled and replaces the previous beam intensity signal controlling the laseer output level.

3 Claims, 3 Drawing Sheets

MEANS AND METHOD FOR CONTROLLING RASTER OUTPUT SCANNER INTENSITY

BACKGROUND AND MATERIAL DISCLOSURE STATEMENT

This invention relates to a raster output scanner (ROS) electrophotographic printer and, more particularly, to a ROS whose output is corrected for writing beam intensity variations by modifications in the process control electronics.

Prior art printers utilizing a raster output scanner (ROS) typically also utilize a rotating polygon having flat reflective surfaces, or facets, in parallel with the axis of rotation of the polygon. A beam, (or beams if a multiple diode is used) is emitted from a light source such as a helium-neon laser or a diode laser. The light is directed through pre-polygon conditioning optics, modulated according to an input electrical signal, and directed onto the facet surfaces of the rotating polygon. The beams are reflected through a post-polygon conditioning lens system and across the full process width of a photosensitive image plane. In these prior art ROS systems, the pre-polygon conditioning optics are incorporated either in an underfilled facet design where the light beam directed against each polygon facet illuminates only a portion of the facet, or in an overfilled facet design, where the light beam completely illuminates each facet and a small portion of adjacent facets. Comparing the two designs, in an overfilled design the facet size required to produce a given spot size at the image plane is greatly reduced allowing many more facets to be accommodated on the same diameter polygon. This, in turn, permits the scan system to operate at a relatively low rotation rate permitting the use of less powerful (and less expensive) polygon motor drivers. This advantage has, heretofore, been more than offset by two factors: low throughput efficiency and non-uniform illumination at the polygon facets. In order to tolerate the low efficiency (typically 10 to 15%), a higher-powered laser diode is required. The non-uniformity problem results from the fact that the scanning beam, being derived from a laser source, has a Gaussian spot shape which is expanded so that more than one facet of a rotating polygon is illuminated. The expanded beam exhibits an inherent beam intensity variation manifested by a decrease in illumination intensity at both ends of the scan (a condition conventionally referred to as "frown"). As the polygon rotates to scan the spot across the image plane, the amount of light reflected to the medium correspondingly varies, resulting in some degradation of the image.

The above described non-uniformity (frown) is not the only cause of intensity non-uniformities in the output scan. Other possible sources of non-uniformity are charge and development variations within a xerographic printing system; non-uniformities in polygon facet reflectivity, laser power degradation, loss of modulator efficiency and the like. Various techniques are known in the art for accomplishing some degree of compensation for these writing beam intensity variations. One technique incorporates the laser into a feedback loop and then electronically controls the excitation level. Another technique, disclosed in U.S. Pat. No. 4,400,740, describes a system for combining video image signals with beam intensity signals to provide an input to a modulator port which then regulates beam intensity. Still another technique is disclosed in U.S. Pat. No. 4,727,382 to Negishi et al. An intensity control device for a laser in a laser beam printer is described. The intensity control device stores a first representation of a present light intensity of the laser during its non-scanning mode and further stores a second representation of a user selected image density for a hard copy. See Col. 1, line 67–Col. 2, line 29. It is also known in the art to evaluate the laser source printhead at the time of manufacture and to program, or "burn" in, a ROM to create a "smile" correction to the output signal to compensate for the particular frown output intensity variation. Another type of smile correction is disclosed in co-pending application U.S. Ser. No. 07/426,350 now U.S. Pat. No. 4,978,185 assigned to the same assignee as the present invention, The technique disclosed therein, while providing adequate initial compensation, does not correct for the other non-uniformity factors described above which cause changes over time. While the print head could have a new ROM burned in with a correction at a later time, this is an expensive solution and requires removal to a sub-assembly area.

According to the present invention, a plurality of smile corrections are stored in a ROM. A test mode is periodically enabled in which a test pattern print is produced consisting of a plurality of numbered bands of varying density. Each numbered band is associated with one of the correction curves stored in the ROM. An operator, or tech rep, makes a visual identification of the numbered bands on the test pattern print which appears too have an optimum density level. The operator or tech rep then selects that correction signal curve corresponding to the numbered test pattern band he has identified. If the selected band is different from the previous selected band a new correction signal is sent to the laser changing its output beam intensity to the new level. More particularly, the invention relates to a raster output scanner a combination of a laser source for generating modulated high intensity output beams of radiation in response to input video image signals, means to scan said beams across said photoreceptor to expose said photoreceptor forming a latent electrostatic image thereon, means for developing said exposed latent image and transferring said developed image to an output medium, the combination of, a memory means for storing data relating to a plurality of beam intensity correction signals, each stored signal creating a different varying beam intensity exposure of the photoreceptor, and means for periodically providing test pattern video signals to said laser source causing a test pattern output print to be formed, said test pattern test signals containing a plurality of separate areas, each separate area exposed with an intensity profile corresponding to one of said beam intensity correction signals.

DETAILED DESCRIPTION OF THE INVENTION

Figure 1:
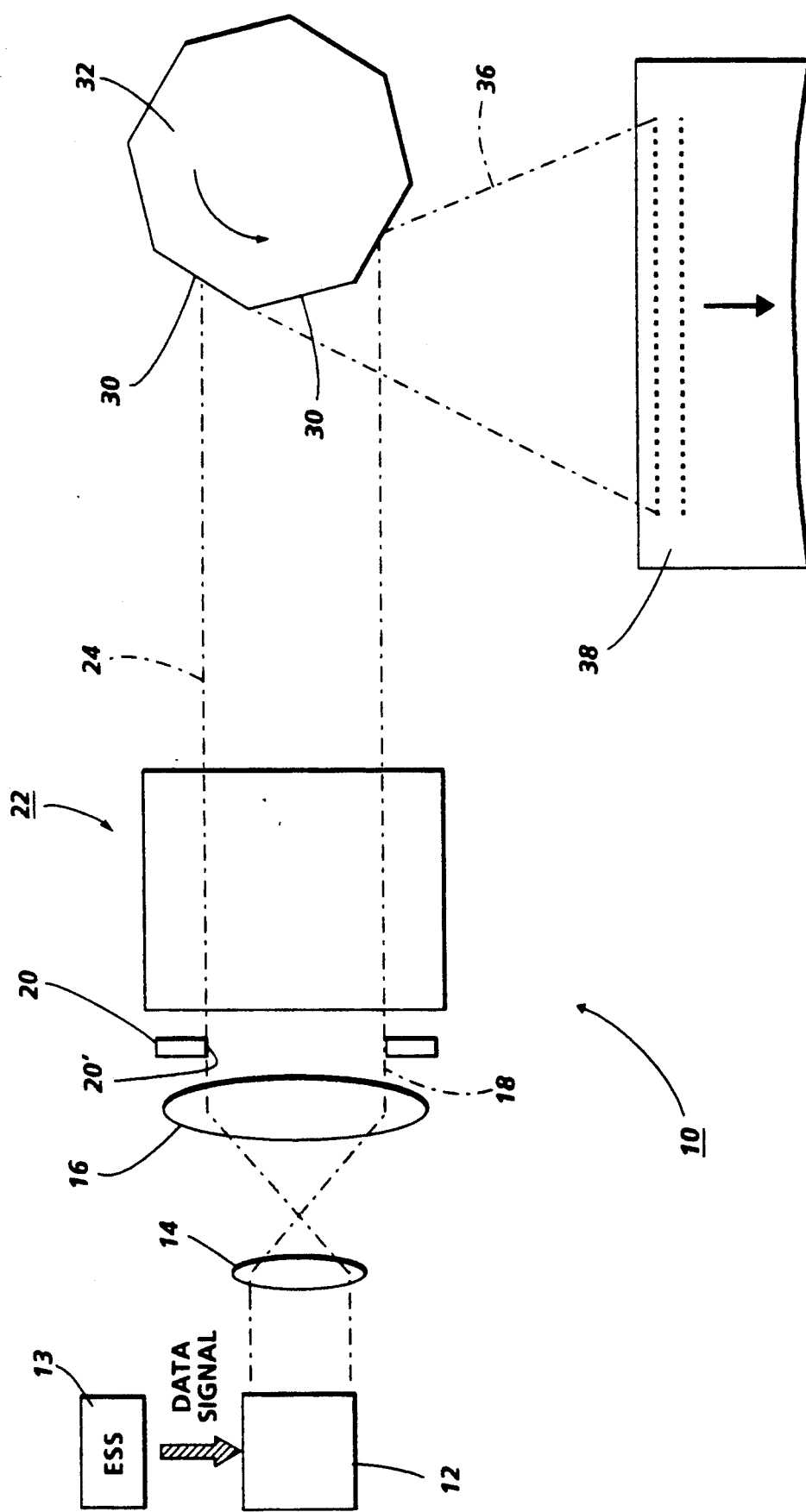
FIG. 1 is a schematic top view of a prior art ROS scanning system operating in an overfilled polygon facet design.

Referring to FIG. 1 of the drawings, there is shown a prior art ROS system 10 of type having an overfilled polygon facet design. As shown, a light source 12, which in a preferred embodiment includes a laser diode 12, serves as the source of coherent high intensity, radiation. The diode is self-modulating and the modulated output beam of light is in conformance with the information contained in a binary data image signal sent from an image processing unit in ESS 13. The image signals may originate from a memory disc, raster input scanner (RIS) and the like. The ESS also generates clocking signals and a beam intensity signal which controls the light output level of the laser. The modulated output beam from the source laser 12 is expanded by the two lens beam expanders 14, 16 following which the expanded beam of light 18 passes through a line-like aperture or slit 20' formed by aperture plate 20. The beam 18 passes through pre-polygon lens system 22. Lens system 22 focuses the beam 18 to a controlled energy distribution beam 24 which is reflected from mirrored facets 30 of rotating polygon scanner 32.

With the rotation of polygon 32 in the direction indicated by the arrow, light beam 36 is reflected from each illuminated facet 30 and passes through a series of post-polygon lenses (not shown, but conventional in the art) which image (scan) the beam 36 across the full process width of a charged photoreceptor 38, only a portion of which is shown. The beam 36 is incident on the photoreceptor surface with an intensity which, if uncorrected, is subject to a decrease in raster spot intensity at both ends of the scan (frown error). This error, shown in FIG. 2 as plot A, results in a modulation of, for example, approximately 10% in the illumination level of the scanning beam. This frown error can be corrected, as is known in the art, by generating a smile corection signal in ESS 13 which is the inverse of the frown curve, and, applying the signal to source 12 to vary the output intensity of the laser, thereby effectively increasing the illumination levels at the beginning and end of scan, to reduce the illumination level across the center. (See plot B in FIG. 2.) The net result is that the illumination level of the scanning beam at the photoreceptor surface is uniform. The latent image formed on the photoreceptor is then developed and transferred to an output medium as known in the art.

Figure 4:
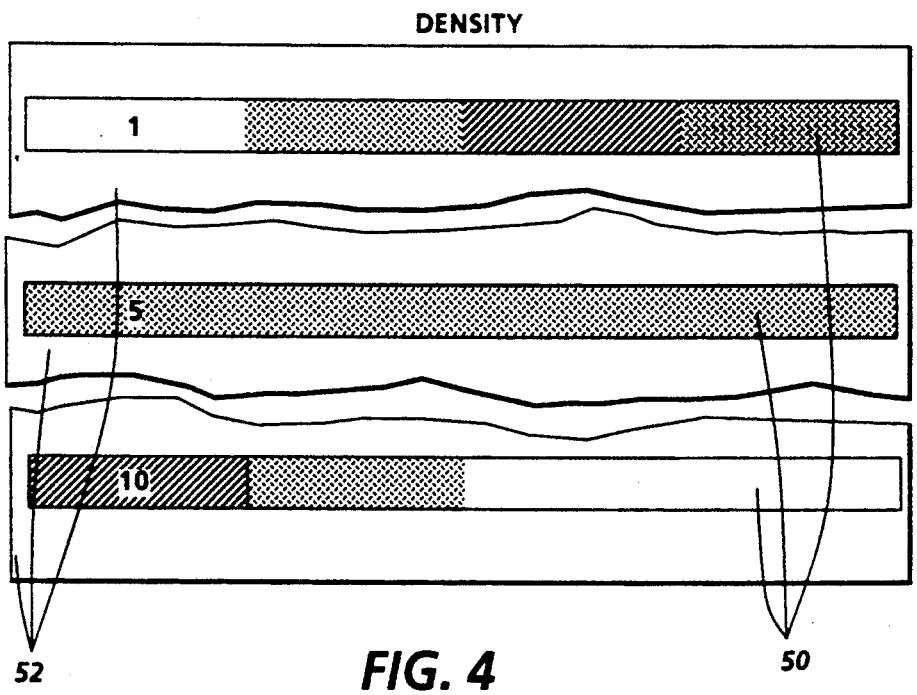
FIG. 4 shows a test pattern output print with a plurality of bands of differing density corresponding to a plurality of beam intensity correction curves.
Figure 3:
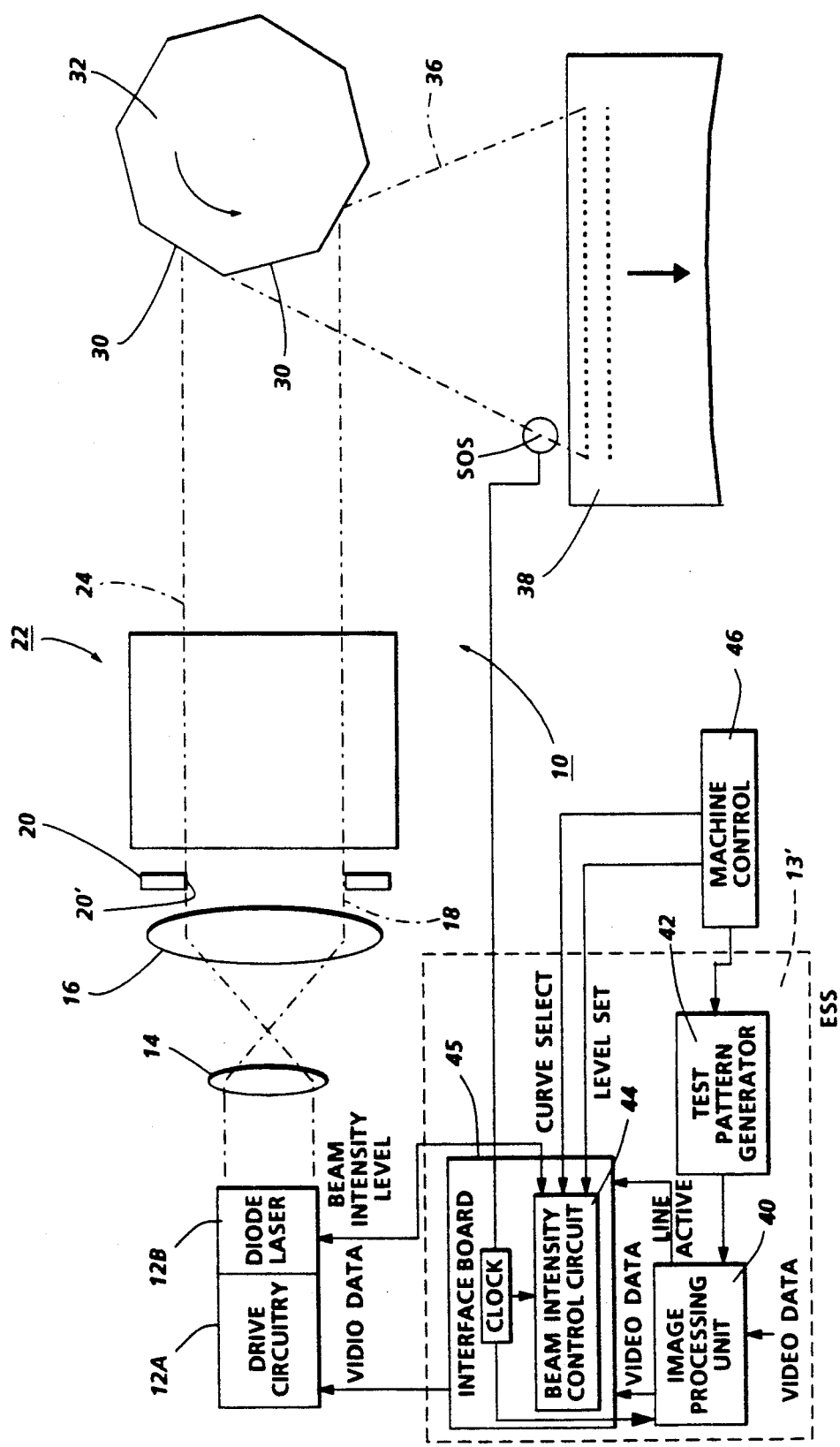
FIG. 3 is a schematic diagram of an electronic subsystem (ESS) containing control circuitry for enabling test pattern generation and beam intensity correction circuit.

While the smile correction may prove sufficient, at least initially, to correct for frown, the correction is not sufficient to sustain uniform beam intensity of the scanned beam at the image plane with the passage of time. This is because the other factors mentioned above in the background section begin to degrade this uniformity, especially the charge and development variations in the xerographic processing system. According to the present invention, the ESS is modified from the prior art description provided in connection with the FIG. 1 embodiment by incorporating an expanded, addressable family of beam intensity correction signals, each signal providing a distinctive smile correction for a corresponding frown condition. Additional circuitry is provided to generate a test pattern output print comprising a plurality of horizontal bands. Each band is exposed at the photoreceptor during a scan whose beam intensity corresponds to one of the beam intensity correction signals. Thus, each beam will have a unique density variation pattern along its length. An operator or tech rep then can visually determine which of the bands appear to provide the desired optimum density level and "dial in" the new correction curve. FIG. 3 shows a modification of the FIG. 1 circuit where an ESS 13' contains an image processing section (IPS) 40, a test pattern generation circuit 42 and a beam intensity control circuit 44. Test pattern circuit 42 stores electronic representations of test patterns, which, when imaged onto photoreceptor 38 and developed and transferred onto an output media, appear as horizontal bands 50 on a print 52 as shown in FIG. 4. Each band is identified by a number which is formed as part of the image. Ten horizontal bands have been selected for this example to represent an initially optimum correction curve (band 5) as well as two extreme corrections numbered 1 and 10. Other band selections are possible as will be described below.

Assuming now that the system has been in operation for some time and some degradation of output copy quality has been noted, either by the operator or by a tech rep, corrective action is then initiated by enabling a test mode of operation. The printer, according to a further aspect of the invention, is modified so as to enable circuits 42, 44 to be addressed from the printer via machine control 46. The appropriate test pattern signal is generated by an operator or tech rep and sent to test pattern generator circuit 42. The output of circuit 42, which is a data bit stream representing previously loaded test pattern information, is sent to laser drive circuit 12A via interface board 45. The modulated output beam from laser 12B, at the initial beam intensity level, scans and forms an image at the photoreceptor 38 surface which is subsequently processed to form an output print pattern 50 (FIG. 4). The operator or tech rep examines the print and selects that band which visually appears to provide the optimum density. Presumably, the signal will be other than the central segment 5 which is no longer optimum. A selection is then made at the control panel of the intensity signal which is associated with that particular numbered band. For example, band 6 (not shown) may now appear optimum indicating that the correction curve corresponding to that band should be enabled. A signal is sent to circuit 44 from control 46 deactivating the previous beam intensity control circuit and replacing it with the correction curve identified by the test pattern comparison correlation. The system can then operate with the corrected beam intensity signals until the need for further correction is evidenced.

Figure 2:
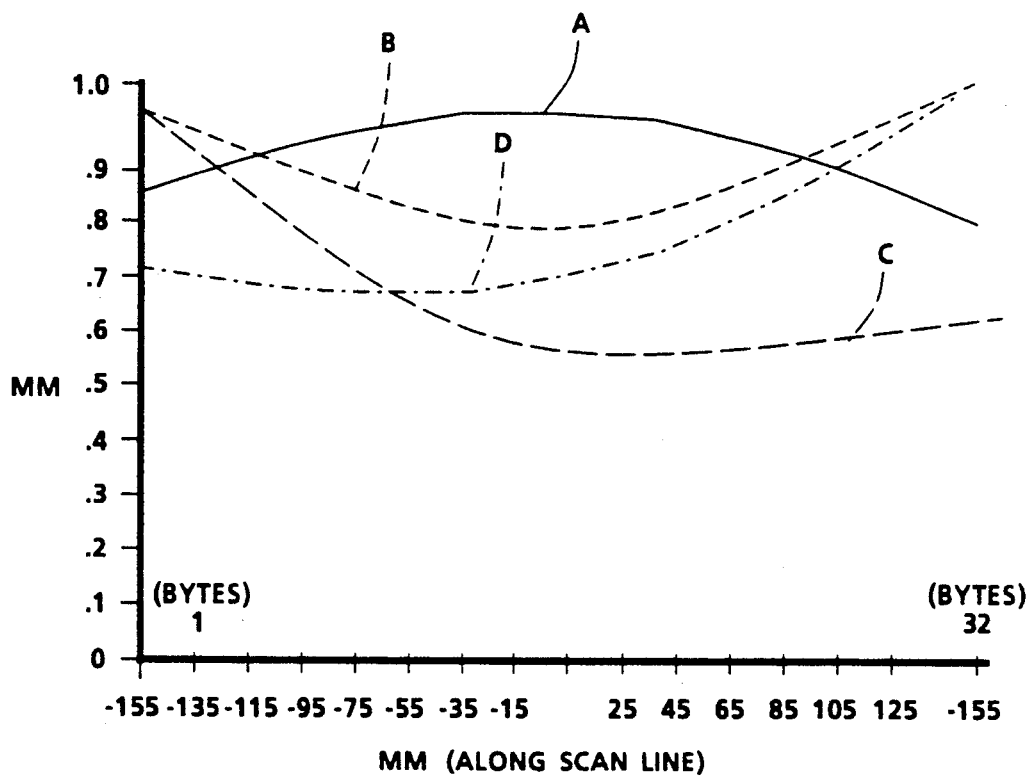
FIG. 2 is a plot of scanning beam illumination level along a scan line across the surface of the photoreceptor in FIG. 1 showing a plurality of frown correction curves.

Beam intensity control circuit 44, in a preferred embodiment, is a read only memory (ROM) which has a plurality of smile correction curves stored therein. The smile corrections are generated and stored at initial setup of the ROS system. Referring to FIG. 2, plots A and B represent the frown and smile intensity levels, respectively along the actual scan line at photoreceptor 38. In the example, the scan line extends along a distance of 13.65 inches (343 mm) and is segmented into a 32 byte count. Each byte represents a discrete voltage change (a 0-10 voltage range has been found satisfactory). The combined voltage changes are filtered to provide a smooth output voltage. The analog output voltage representing smile correction curve B is thus one of the correction curve digitized and stored in ROM circuit 44. A plurality of other correction curves, represented by plots C and D, are generated and stored in like manner. Plot C represents corrections for extreme intensity illumination reduction at the left (start of scan) and the line while curve D represents an extreme drop off at the right (end of scan) of the line. It is apparent that any number of frown subsets of plot A may be computed and a corresponding smile correction representing the inverse of the particular frown can also be computed, plotted and stored as a smile correction signal in circuit 44. The number of correction curves is limited by the capacity of the ROM in circuit 44 and could number in the thousands. For practical reasons, however, a much smaller number, 10, for this example, should prove feasible for most systems. The output of circuit 44, representing selected beam intensity level is converted to an analog signal, smoothed and sent to a laser drive circuitry 12A. Once the desired number of correction voltages are stored in the ROM, test pattern print generator circuit 42 can be programmed to provide a test print having a plurality of horizontal bands, each band formed at a intensity level correlated to one of the stored correction signals. Circuit 42 is adapted to generate a data bit stream output which incorporates image data information which will sequentially expose via the ROS system the ten bands at the photoreceptor at an intensity corresponding to the ten selections of correction signals. Thus, referring to FIGS. 2 and 4, band 5 of print 52 is exposed at the beam intensity level provided by correction curve B, band 1 by plot C and band 10 by plot D. The additional bands (not shown) would be selected to represent correction curves intermediate plots C and D.

The timing and clock circuits for start of scan (SOS) and end of scan detection for polygon rotation and photoreceptor 38 movement in the process direction are controlled by conventional IOT control software as is known in the art.

While the invention has been described with reference to the structure disclosed, it will be appreciated that numerous changes and modifications are likely to occur to those skilled in the art, and it is intended to cover all changes and modifications which fall within the true spirit and scope of the invention. For example, while the test pattern print comprise a plurality of horizontal bands, the bands may be replaced by discrete areas having other configurations e.g., circular, triangular, etc. While the bands are identified with numbers, other indicia such as letters may be used.

I claim:

1. In a raster output scanner a combination of a laser source for generating modulated high intensity output beams of radiation in response to input video image signals, means to scan said beams across a photoreceptor to expose said photoreceptor forming a latent electrostatic image thereon, means for developing said exposed latent image and transferring said developed image to an output medium, the combination of,
   a memory means for storing data relating to a plurality of beam intensity correction signals, each stored signal creating a different varying beam intensity exposure of the photoreceptor, and means for periodically providing test pattern video signals to said laser source causing a test pattern output print to be formed, said test pattern output print formed with a plurality of horizontal bands of differing density, each band produced by a scanning beam having a beam intensity which varies across scan in conformance with an associated one of said beam correction signals, and wherein one of said bands has a generally uniform density further including means for changing the beam intensity level of said laser output in response to changes in the test pattern band representing optimum density.

2. The raster output scanner of claim 1 wherein said horizontal bands are formed with identifying indicia within the band, and further including control means which enables selection of a corresponding beam intensity correction signal associated with said indicia.

3. A method for correcting for variations in scanning intensity levels in a ROS printer comprising the steps of,
   creating and storing in memory input data signals representing a test pattern of varying density segments,
   creating and storing in memory a series of beam intensity correction signals, each said correction signal associated with one of said test pattern density segments, and
   periodically inputting to a laser source, said test pattern input data, scanning the laser output across a photoreceptor surface to produce a latent image of pattern density segments developing said latent image and transferring the image to an output sheet comprising a test pattern print having a plurality of horizontal bands of differing density, visually observing said bands and identifying a band of optimum uniform density, selecting the beam intensity correction signal associated with said identified band, and applying said correction signal to said laser.

* * * * *